Sept. 20, 1938.   W. K. LEWIS   2,130,669
PROCESS FOR PRODUCING VALUABLE PRODUCTS FROM HYDROCARBON GASES
Filed Sept. 2, 1933   2 Sheets-Sheet 2

Warren K. Lewis  Inventor
P. L. Young  Attorney

Patented Sept. 20, 1938

2,130,669

UNITED STATES PATENT OFFICE 2,130,669

PROCESS FOR PRODUCING VALUABLE PRODUCTS FROM HYDROCARBON GASES

Warren K. Lewis, Newton, Mass., assignor to Standard Oil Development Company, a corporation of Delaware Application September 2, 1933, Serial No. 688,035

12 Claims. (Cl. 260—641)

The present invention relates to an improved process for utilizing waste gases and more specifically to an improved method for producing alcohols from gases rich in olefines and particularly ethyl alcohols, from gases rich in ethylene. The invention will be fully understood from the following description and the drawings.

At the present time the greatest part of the ethyl alcohol is produced from vegetable matter but there is a large potential source in the waste gases from petroleum refining, especially from cracking operations. It has been long known that such olefines could be dissolved in strong acid solutions, especially sulfuric acid of relatively high concentration and that on dilution hydrolysis is accomplished releasing the alcohol which then can be distilled from the dilute solution. Such a process has been utilized to produce higher alcohols but for various reasons it has never been used to produce ethyl alcohol in any considerable amounts. The present invention, while somewhat similar to previous methods, and applicable to the production of alcohols from olefins generally, is particularly adapted to the production of ethyl alcohol from ethylene.

Referring to the drawings.

Figure 1:
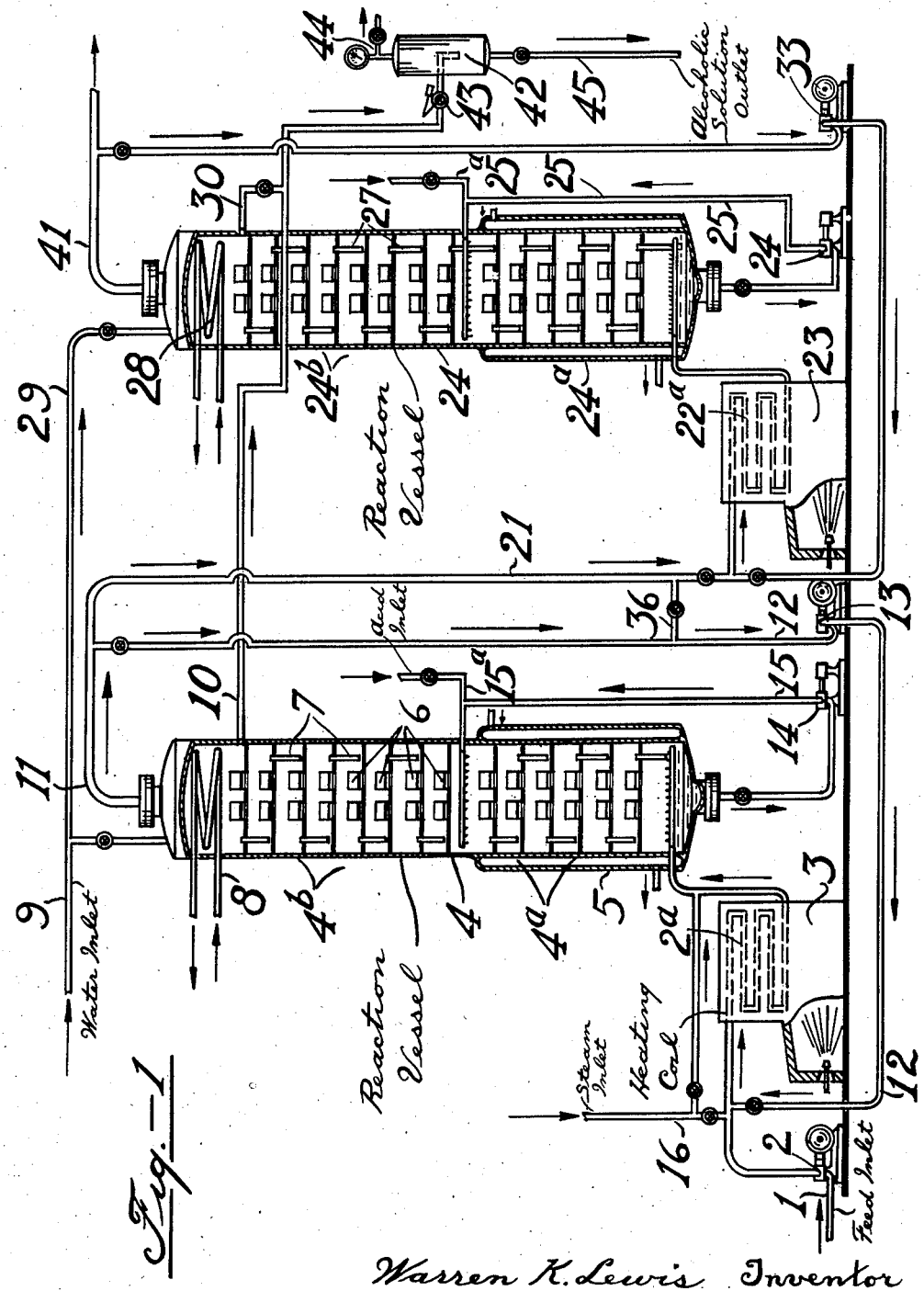
Fig. 1 represents in diagrammatic form an apparatus adapted to carry out the direct hydration of ethylene, and other olefines.

Referring to Fig. 1, numeral 1 designates a feed line supplying gas rich in ethylene. This may be produced from heavier hydrocarbons such as propane, butane and the like by cracking, or the ordinary cracked gases obtained from the production of gasoline from heavier boiling hydrocarbons may be used. A pump 2 compresses the gas to a high pressure for reaction which will be specified below. The compressed gas is then highly heated by passing through a coil 2a arranged in the furnace setting 3. This gas then discharges into the base of reaction vessel 4 which may be the first of a series of several such chambers of which only two are depicted. The reaction vessel is in the form of a tower and is made up of a lower portion 4a, which is the reaction chamber proper, and an upper portion 4b which is more properly called a separation zone. The reaction zone 4a may be heated solely by hot gases entering or it may be heated by a jacket 5. Both the zones 4a and 4b are fitted with vapor liquid contact means such as the bubble cap plates 6 and overflow pipes 7 are provided which may be of any particular type or design. The separation zone 4b is furnished with a reflux coil 8 at the upper end and may also be supplied with a regulated stream of water from pipe 9. A part of the reflux produced by the coil flows through the separation zone and back to the reaction zone 4a. The product is partly withdrawn as a side stream by pipe 10. The gas leaving the top of the separation zone by pipe 11 may be discharged, but a portion is preferably returned by pipe 12 and pump 13 to the inlet of coil 2a. Liquor may be withdrawn from the base of the tower 4a by a pump 14 and it may be circulated to the upper end of such zone by a pipe 15. Water or acid may be added to the dilute acid by a pipe 15a in order to maintain the acid concentration of the zone at the proper degree, but is preferably introduced as steam above its critical temperature through pipe 16.

As noted before, zone 4 may be used alone or may be one of a series of two or more such zones. In the drawings a second zone 24 is also shown with equipment which substantially duplicates that in the prior unit. The gas leaving zone 4 is forced through pipe 21, through heating coil 22a, and then through the reaction and separation zones 24a and 24b respectively as in the previous unit. The gas leaving the top of zone 24b may be circulated by a pump 33 and the remainder is conducted by pipe 41 to succeeding units or to the burners or may be utilized for some other purpose.

The side streams withdrawn from the separation zones 4b and 24b may be combined and withdrawn to a vent tank 42 with a suitable reduction in pressure at valve 43. The gas is vented by a pipe 44 and the dilute alcoholic solution is drawn to storage by pipe 45. The alcoholic product may be relatively concentrated. The catalytic solution may contain from 2 to 10% alcohol but the condensed product can be made richer by providing an efficient separation zone, for example, to 50 to 70% or higher. In a similar manner, liquor withdrawn from the base of zones 4a and 24a may be admixed and recirculated by means of a single pump 15 and line 14 or such liquors may be separately handled so as to use different solutions or concentrations of the same solution in the two zones.

Figure 2:
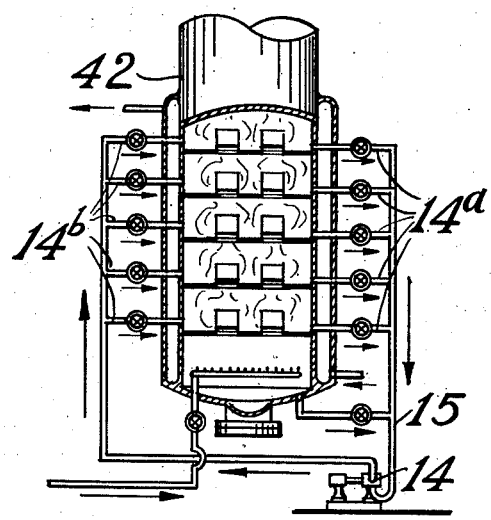
Fig. 2 shows an alternative arrangement of the reaction zone.

Turning to Fig. 2, a portion of reaction zone 4a is shown in an alternative manner. In this plan the catalytic liquor is withdrawn from each of the plates in the reaction zone 42 by pipes 14a and the several streams are admixed and returned to the plates by pipes 14b in proportions to maintain the liquid level. In this manner a concentration gradient of the liquid in the absorption zone, which would be brought about by evaporation of water from the lower pools, may be substantially eliminated, especially where catalytic liquor comprises an aqueous solution of an involatile substance, as will be described below. It will be understood that the arrangement shown in Fig. 2 may be substituted for that shown in Fig. 1.

Figure 3:
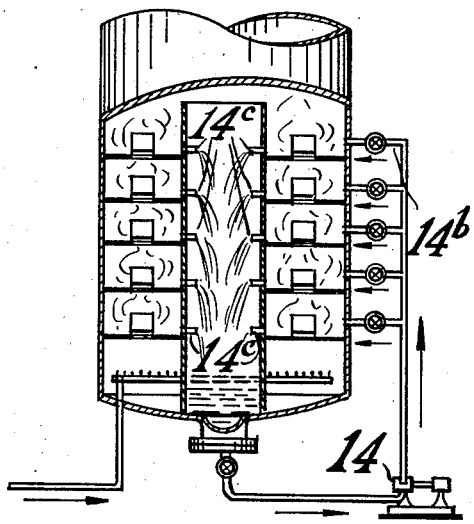
Fig. 3 shows a further arrangement thereof.

In Fig. 3 the reaction zone 4a is arranged with an overflow pipe 14c which automatically maintains a steady liquid level in each plate. In this case, as before, the admixed liquor is returned to the several plates in adjusted proportions by the pipe 14b.

Figure 4:
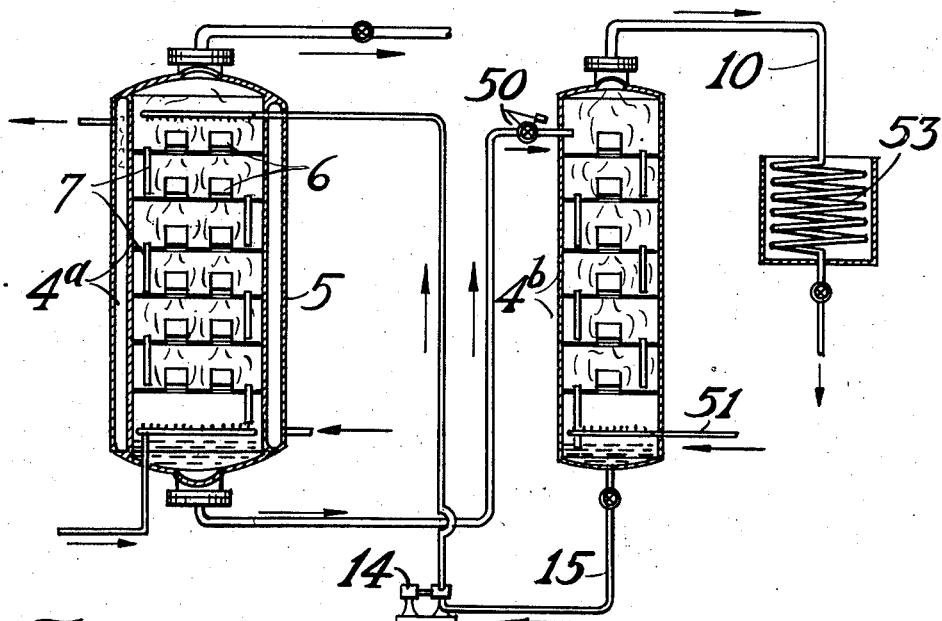
Fig. 4 shows a still different plan particularly adapted to olefines higher than ethylene.

In Fig. 4 a somewhat different arrangement of reaction and separation zones 4a and 4b is shown. The reaction zone 4a comprises one tower which is operated at high pressure and a separate tower 4b is operated at lower pressure. The corresponding parts are numbered as in Fig. 1 and it need only be said that the zone 4a may be operated at lower temperature or with higher olefines and under conditions such that the alcohol formed in the reaction is not distilled from zone 4a, as in the previous arrangements, but is retained in the liquor which is substantially stripped of the alcohol in 4b. Reduction of pressure occurs at valve 50 and the gas may be added to the base of the stripper 4a by a pipe 51. This may be a portion of the high pressure outlet gas or may be other gases or steam. The alcohol is obtained as a distillate from line 52 by condenser 53 and is collected in storage vessel 54. The catalytic liquor is returned to the reactor 4 by a pipe 15 and pump 14. This particular embodiment is not especially desirable for the production of ethyl alcohol but is more suitable for the production of higher alcohols such as butyl and the like from the corresponding olefines.

As will be disclosed below, the preferred catalysts used in the process are of an acidic nature. The reaction vessel and other equipment must be made therefore not only to withstand the high pressures which will be disclosed below and the temperatures, but likewise the corrosive effects of free acid in dilute concentration. Pressure vessels provided with ceramic especially vitrified ceramic linings are preferred but other linings may be used such as lead, silver, or alloys such as the acid resistant products rich is silicon. Metallic pumps may be avoided by the use of gas lifts, acid eggs and the like.

It has been previously suggested to absorb lower olefines in sulfuric acid of concentration of from 80 to 100%, depending on the particular olefine and at normal or moderate pressure and then to separate the alcohol by distillation, after dilution to an acid concentration of 30 or 40 to 70% as a maximum which permits hydrolysis again depending on the olefin. It is necessary in such a process to dilute in order to be able to distill off the alcohol. In other words, there was an absorbing strength and a hydrolyzing strength. At atmospheric or moderate pressures these concentrations are, as stated above, widely separated. It has been discovered that under the highly elevated pressures the acid strengths for absorption and hydrolysis approach each other and if pressure is sufficient, the same strength acid is capable of both absorbing and hydrolyzing. The reaction under such conditions becomes smooth and acid reconcentration is completely avoided. The conditions of operation of the present process will now be explicitly set forth.

The temperature for the hydration of ethylene and other olefines according to the present process which employs dilute catalysts falls within the broad limits of 250 to 350° C. and there is a sharply defined maximum at approximately 300° C. This appears to be a balance of reaction rate and the most favorable equilibrium but it appears to be about the same for all dilute catalysts tried.

With respect to pressure it has been found, as stated above, that under atmospheric or moderate pressures of several atmospheres there is substantially no hydration with dilute mineral acids or with aqueous solutions of the salts tried. As pressure increases the reaction rate becomes perceptible and increases slowly to about 300 atmospheres. For unexplained reasons the yield of alcohols rises sharply on further increase of pressure to about 400 atmospheres and continues to rise thereafter more slowly. There is no apparent reason for this sharp rise and it is believed that it could not be predicted from the present published thermodynamic data. For the present process, pressures in excess of 300 atmospheres are used and even in excess of 400 atmospheres are contemplated, although for practical reasons pressures of 350 to 500 atmospheres are considered most suitable.

The catalysts which may be employed are of several types, most of which have been previously used at low pressure in high concentration and under such conditions are known to absorb olefines. Such absorption is, of course, chemical as distinguished from mere physical solution. The catalysts used may be best described as "diluted absorption agents" and by such terms it is meant that the dilution is sufficient to prevent absorption at normal or moderate pressures. Among the mineral acids hydrochloric and other halide acids may be used but the less volatile and more stable mineral acids, such as sulfuric and phosphoric are preferred. Organic acids such as acetic and oxalic are useful but metal halides, such as those of cadmium, zinc, ammonium and aluminum are better. In general it may be said that the higher the acid strength of the catalyst, the lower is its effective concentration in the present process.

With different catalysts, different concentrations are preferable. For example, with phosphoric acid concentration rapidly increases the yield up to a maximum at about 5% but beyond that concentration the activity decreases markedly. The activity with 5% acid is much greater at 300° C. and 400 atmospheres than with the stronger acids as used in the prior art. Six per cent sulfuric acid is satisfactory, although it may be used in lower concentrations, say from 1 to 4% or 10% or somewhat higher, but always well below 1.6 specific gravity which is the lower limit for absorption at normal or moderate pressures. Again, however, high pressures appear to favor the low acid concentrations which are useless at atmospheric and moderate pressure. Some of the catalysts effect considerable polymerization and of these sulfuric acid is one. Phosphoric acid on the other hand, while apparently somewhat less active, does not effect polymerization of the olefin to anything like the same extent. Ten per cent acetic acid is not so good as 2% hydrochloric acid and boric acid has been found to be even less active. With various metal salts the concentrations are likewise varied and a few tests are required to show the optimum concentration. With aluminum chloride (AlCl₃.6H₂O) 15 to 20% solution gives an optimum output at 300° C. while zinc chloride is apparently the best at about 50%.

The time for reaction likewise changes with the temperature, particular catalyst and degree of agitation used. It is, however, usually of the order of ¼ to 2 hours. With almost all of the catalysts mentioned above, one to three hours are required to give good yields without positive agitation but on increasing the contact equally good results are obtained with less time.

As to the particular manner in which the apparatus is to be operated, it is sufficient to raise the temperature of the gas and steam to a point in excess of about 300° C. and preferably to raise it even about 400° C. in order to heat the reaction zone. The reaction itself is accomplished without serious heat effects and it has been found that the inlet gas can be charged with sufficient heat to make the process operate smoothly. Additional heat may, of course, be supplied by a jacket around the reaction zone and this may be desirable in order not so much to supply additional heat as to maintain the temperature substantially constant throughout the reaction zone. It will be understood that the gas need not be raised to a reaction temperature and heat may be added through a jacket or similar heat transferring means. The concentration of the catalysts and the temperature of the reaction zone are preferably maintained substantially constant throughout and various expedients may be employed to accomplish this. The arrangements of the contact zone shown in Figs. 1, 2 and 3 are most suitable for the hydration of ethylene and under these conditions the olefine gas bubbling through the catalyst liquor is directly hydrated and the unreacted gas rich in alcohol vapors is swept out of contact with the catalytic solution and into the separation zone from which the alcohol is preferably removed in liquid state after partial condensation. Average reaction rate is increased in a multi-tower system by recirculating a part of the gas as shown in Fig. 1.

The apparatus shown in Fig. 4 is most suitable for higher olefines such as butylene. In such case the gases are bubbled through the catalytic liquor but the alcoholic vapors may not be distilled under the high pressures and the stripping zone may be operated at a lower pressure to effect the separation. It will be noted in this case, however, that additional dilution is not required to free the alcohol from the catalytic liquor.

The essential features of the new process are the use of the pressures well above the critical pressure of water and temperatures below the critical temperatures as well as properly adjusted ratio of olefines to steam or water. This adjustment of the three factors allows variation of any one factor if the others are adjusted to compensate therefor so that the aqueous catalyst is maintained at a substantially constant concentration, preferably that of maximum activity. There may be slight variations in concentration thruout the runs but there is no occasion for concentration for absorption and dilution for separation as hitherto practiced. The optimum conditions have been outlined above except for the ratio of steam to olefines and this is ordinarily in excess of 2 to 1 and may be 4 or 5 to 1 or even higher.

As examples of the operation of the present process, the following tests may be considered:

1. A mixture of pure ethylene and water is contacted with a 7% solution of sulfuric acid at a temperature of 300° C. while under pressure of 400 atmospheres the conditions being adapted to prevent concentration or dilution of the catalytic solution. The aqueous solution obtained contained 9.96% of ethyl alcohol.

2. Ethylene and water are contacted with 1% hydrochloric acid at 325° C. and 500 atmospheres, and an aqueous liquor containing 7.67% ethyl alcohol is obtained. The product is slightly yellowish in color and has a slightly etherial odor.

3. A series of similar tests are made with 2% hydrochloric acid as a catalyst and a time of two hours. In all tests a temperature of 300° C. and a pressure varying from 200 to 500 atmospheres are used. In the following table the per cent alcohol collected in the aqueous liquor is given for the various pressures used:

| Pressure | Per cent alcohol in aqueous solution |
|---|---|
| 200 | 2.5 |
| 250 | 2.6 |
| 300 | 2.7 |
| 350 | 5.1 |
| 400 | 7.0 |
| 450 | 7.5 |
| 500 | 7.75 |

4. The following series of tests is adapted to show the effect of temperature. All tests are similar in respect to pressure, catalysts, catalyst concentration and ratio of olefin to steam. The catalyst is 3% H₂SO₄, pressure 400 atmospheres.

| Temperature °C. | Per cent alcohol in aqueous solution |
|---|---|
| 250 | 5.6 |
| 275 | 7.2 |
| 300 | 8.4 |
| 325 | 6.3 |
| 350 | 3.2 |

5. The following series of tests show effect of catalyst concentration. The tests are all comparable as before, temperature being 300° C., pressure 400 atmospheres. The catalyst is AlCl₃.6H₂O.

| Per cent AlCl₃.6H₂O | Per cent alcohol in aqueous solution |
|---|---|
| 5 | 4.9 |
| 10 | 8.3 |
| 15 | 10.0 |
| 20 | 6.5 |

The last three examples show the effects of separate variations of different factors and similar results are obtained with various catalysts and conditions within the range broadly specified above.

The present invention is not to be limited by any theory of the mechanisms of the reactions nor to any particular catalysts or conditions of temperature and pressure, but only by the following claims in which it is desired to claim all novelty inherent in the invention.

I claim:

1. An improved process for direct hydration of olefins comprising passing the olefin in vapor form with steam through a series of pools of a catalyst comprising a dilute aqueous hydration agent maintained at a pressure in excess of 300 atmospheres and at a temperature between 250 and 350° C., adapted to permit the alcohol formed by the reaction to be distilled concurrently from the aqueous solution without concentration of the catalyst, removing the alcohol vapors and condensing the same.

2. Process according to claim 1 in which the alcoholic vapors are condensed under full pressure and separated from the uncondensed vapors and gas.

3. An improved process for the direct hydration of ethylene comprising passing a gas rich in ethylene through a series of pools containing as a catalyst a diluted acid absorption agent maintained at a temperature of the order of 250–350° C. and pressure in excess of 300 atmospheres, whereby the olefine is hydrated and ethyl alcohol is released from the catalytic solution, maintaining the volume and acid strength of the catalytic pools and removing alcohol vapors therefrom.

4. Process according to claim 3 in which alcohol vapors are condensed under full pressure and withdrawn as a liquid.

5. Process according to claim 3 in which a mixture of gas and vaporous alcohol arising from the catalytic pools is cooled so as to condense the alcohol, withdrawing such condensed alcohol, separately withdrawing uncondensed gas and recirculating a portion thereof through the pools of acid catalysts in admixture with fresh gas.

6. Process according to claim 3 in which the catalytic liquid is removed from the pools thereof and returned thereto in order to maintain volume and acid strength at the same degree throughout all of the pools.

7. Process according to claim 3 in which the catalytic acid liquor is allowed to circulate through the series of pools.

8. Process according to claim 3 in which the gas passes through a primary series of catalytic acid pools, and alcohol is separated from the mixture of gases and vapors arising therefrom, and the remaining gas is passed through a secondary series of pools and a second portion of alcohol is then separated from such gas.

9. An improved process for the direct hydration of ethylene which comprises bubbling a gas rich in ethylene through a series of pools of a dilute acid catalyst, but of less than absorption strength while under pressure in excess of 300 atmospheres and a temperature of approximately 300° C. whereby alcoholic vapors and unreacted gas arise from the pools, cooling the gas and vapor mixture to condense the alcohol, removing it in liquid form and separately removing the gas and maintaining the acid concentration of the catalyst.

10. Process according to claim 9 in which the catalytic pools are maintained at a strength below that of the absorption of alcohol throughout.

11. Process according to claim 9 in which a gas rich in ethylene is heated in excess of 300° C. and sufficiently to maintain the catalytic pools at reaction temperature.

12. Process according to claim 9 in which a part of the gas from which alcohol has been condensed is recirculated through the acid pools in admixture with fresh gas.

WARREN K. LEWIS.